United States Patent [19]
Olofsson

[11] Patent Number: 5,910,343
[45] Date of Patent: Jun. 8, 1999

[54] DEVICE AT RAILWAY WHEELS AND METHOD FOR OBTAINING SAID DEVICE

[75] Inventor: Johan Lennart Olofsson, Umeå, Sweden

[73] Assignee: Duroc AB, Umea, Sweden

[21] Appl. No.: 08/624,394

[22] PCT Filed: Oct. 4, 1994

[86] PCT No.: PCT/SE94/00920

§ 371 Date: Apr. 4, 1996

§ 102(e) Date: Apr. 4, 1996

[87] PCT Pub. No.: WO95/09736

PCT Pub. Date: Apr. 13, 1995

[30] Foreign Application Priority Data

Oct. 5, 1993 [SE] Sweden .................................. 9303245

[51] Int. Cl.⁶ .............................. C23C 14/14; C23C 4/00; C21D 9/04

[52] U.S. Cl. .......................... 427/597; 427/596; 148/512; 148/582; 148/583

[58] Field of Search ..................................... 427/551, 552, 427/554, 555, 556, 559, 596, 597, 557; 118/50.1, 641; 148/512, 581, 582, 583

[56] References Cited

U.S. PATENT DOCUMENTS

| | | | |
|---|---|---|---|
| T967,009 | 2/1978 | Gale | 427/596 |
| 3,992,164 | 11/1976 | Fengler | 427/597 |
| 4,212,900 | 7/1980 | Serlin | 427/597 |
| 4,218,494 | 8/1980 | Belmondo et al. | 427/596 |
| 4,230,488 | 10/1980 | Heller et al. | 295/30 |
| 4,299,860 | 11/1981 | Schaefer et al. . | |
| 4,310,191 | 1/1982 | Halldin | 295/31 R |
| 4,638,540 | 1/1987 | Hasselöf et al. | 295/30 |
| 4,644,127 | 2/1987 | La Rocca | 427/596 |
| 4,698,237 | 10/1987 | Macintyre | 427/597 |
| 5,230,756 | 7/1993 | Kawasaki et al. | 427/597 |
| 5,372,861 | 12/1994 | Kerrand et al. | 427/597 |
| 5,453,329 | 9/1995 | Everett | 427/556 |

FOREIGN PATENT DOCUMENTS

| | | |
|---|---|---|
| 3509582 | 2/1986 | Germany . |
| 452963 | 1/1988 | Switzerland . |
| 467830 | 9/1992 | Switzerland . |
| 9114799 | 10/1991 | WIPO . |
| WO9114799 | 10/1991 | WIPO . |

OTHER PUBLICATIONS

Excerpt from textbook entitled Mechanical Engineering Design, Joseph E. Shigley, McGraw Hill Publishing, 1989, pp. 71–74, No Month.

Translation of Previously Cited DE 3509582 CI Amendc et al. Feb. 1986.

Websters Ninth New Collegiate Dictionary, p. 1168 1990 (No Month).

*Primary Examiner*—Marianne Padgett
*Attorney, Agent, or Firm*—Tarolli, Sundheim, Covell, Tummino & Szabo

[57] ABSTRACT

The present invention relates to a device for improving the adhesitivity of surface refined parts (6) to the body (7) of railway wheels (1), which surface refined parts (6) have been produced by treating the railway wheel (1) with high energy generated preferably by laser radiation (8). In order to prevent or at least obstruct the risk for loosening of the surface refined parts (6) from the body (7) of the railway wheel (1), the maximum thickness (B) of the surface refined parts (6) is selected so that the Hertzian pressure which affects the railway wheel (1) when said wheel is loaded with the maximum permitted pressure thereon is substantially carried by the body (7) of the railway wheel (1) beneath the surface refined parts (6).

9 Claims, 7 Drawing Sheets

DEVICE AT RAILWAY WHEELS AND METHOD FOR OBTAINING SAID DEVICE

FIELD OF THE INVENTION

The present invention relates to a device for improving the adhesitivity of surface refined parts to the body of railway wheels, which surface refined parts have been produced by treating the railway wheel with high energy generated preferably by laser radiation.

The present invention also relates to a simple method for obtaining said device.

BACKGROUND OF THE INVENTION

DE, C1, 35 09 582 teaches a railway wheel which has been surface refined or improved by means of laser radiation. However, the thickness of the surface refined parts is not maximized and said parts have therefore a substantial thickness. The results in that there is a great risk that said parts loosen, i.e. that so called flaking out occurs.

The object of the present invention is to avoid this drawback, which according to the invention is arrived at by providing the abovementioned device with the characterizing features of the present invention.

SUMMARY OF THE INVENTION

A method for obtaining said device comprises according to the invention the characterizing features of the present invention.

Since the device having said characterizing features ensures that the Hertzian pressure is substantially carried by the body of the railway wheel, loosening of the surface refined parts from the body is prevented or obstructed.

BRIEF DESCRIPTION OF THE DRAWINGS

The invention will be further described below with reference to the accompanying drawings, wherein FIG. 1 schematically illustrates a railway wheel on a rail.

DETAILED DESCRIPTION OF PREFERRED EMBODIMENTS

Figure 1:
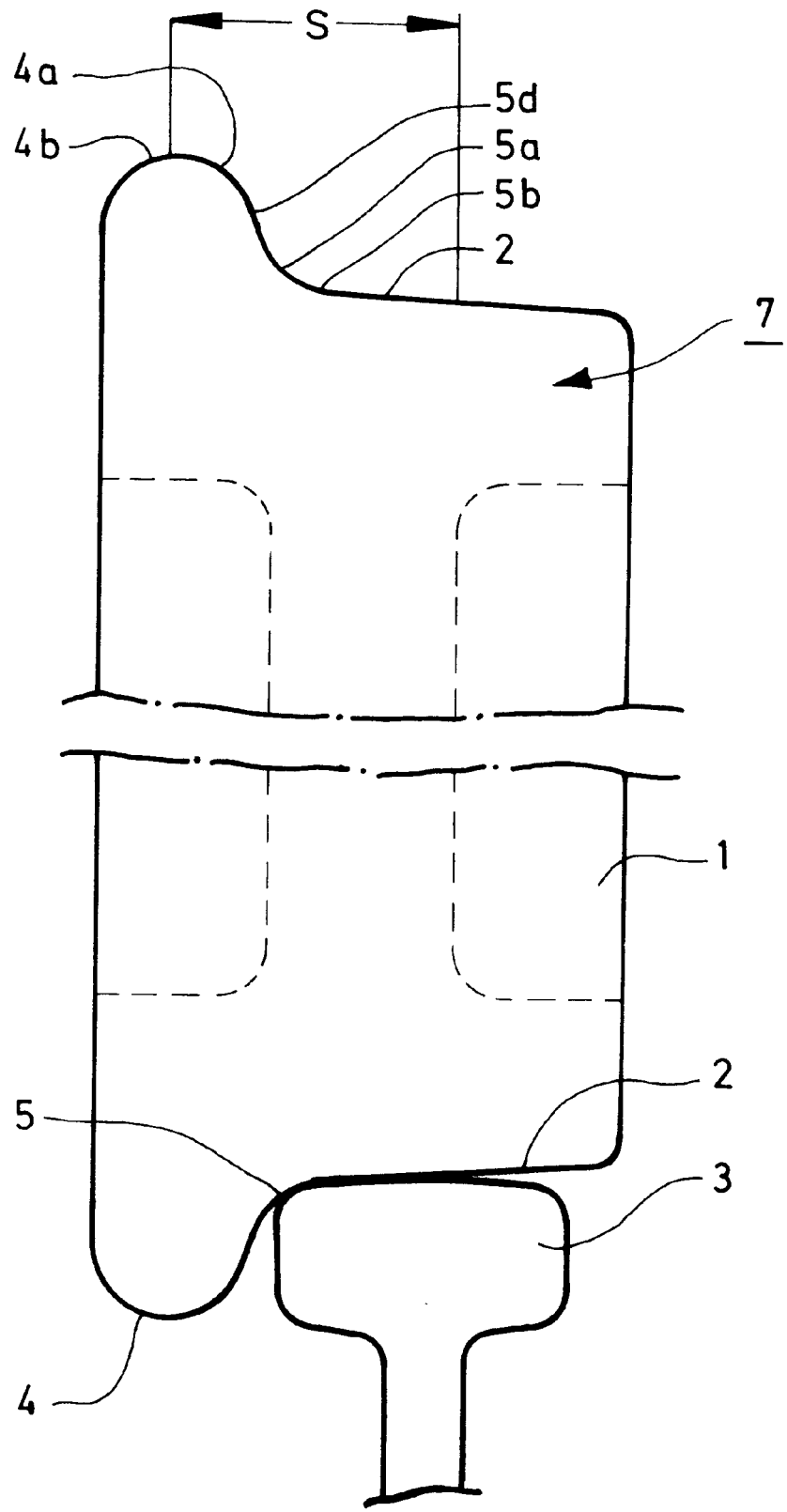
Figure 2:
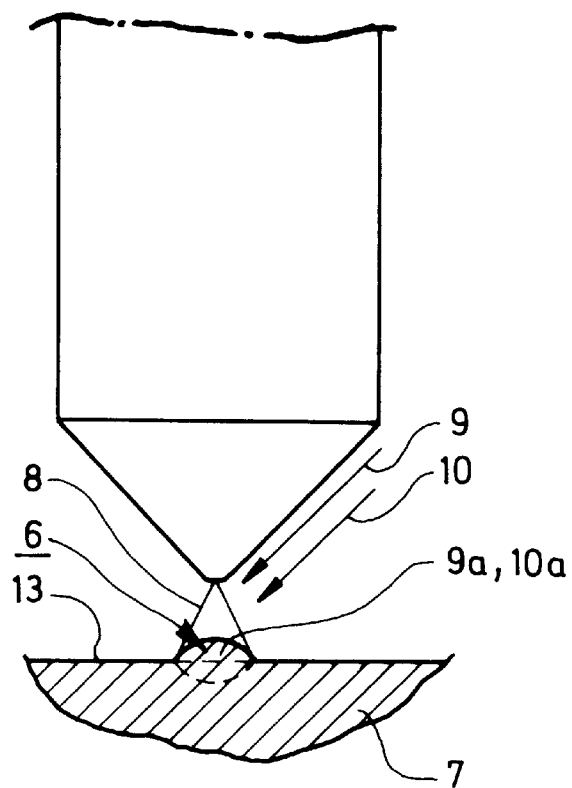
FIG. 2 schematically illustrates a surface treatment of the railway wheel carried out in accordance with the method of the invention, whereby said surface treatment is a surface application.

The railway wheel 1 illustrated in the drawings has a wheel tread 2 through which it is adapted to roll or run on a rail 3. The railway wheel 1 further includes a rail flange 4 which in a manner known per se ensures that the wheel can not move laterally relative to the rail 3 such that it ends up beside said rail. The railway wheel 1 also includes an arcuate transition portion 5 between the wheel tread 2 and rail flange 4. Central parts 5a of this transition part 5 have a smaller radius than the radii of outer parts 5b, 5c on opposite sides of said central parts 5a. When the railway wheel 1 rolls on the rail 3 during movement thereof on straight distances, in curves, on climbs, over switches and so on, it is the transition portion 5, the part 2a of the wheel tread 2 closest to said transition portion 5 and the part 4a of the rail flange 4 closest to said transition portion 5, i.e. those parts 2a, 5 and 4a located within the wheel sector S, which can be worn down by the rail 3 and/or slide thereagainst and/or generate noise during sliding thereagainst.

Those parts 2a, 5 and 4a of the railway wheel 1 which are exposed to said influence and/or permit said influence, are surface refined or improved with high energy, preferably laser radiation, whereby a maximum thickness B of the surface refined parts 6 is selected so that the Hertzian pressure which affects the railway wheel 1 when said wheel is loaded with the maximum permitted pressure thereon is substantially carried by the body 7 of the railway wheel 1 beneath the surface refined parts 6, whereby loosening of said surface refined parts 6 from said body 7 during loading of the railway wheel 1 with the maximum permitted pressure is prevented or obstructed. The maximum thickness of the surface treated parts 6 is preferably 5 mm, whereby it is ensured that the Hertzian pressure affecting the railway wheel 1 when said wheel is loaded with the normally maximum permitted pressure thereon, is substantially carried by the body 7 of the railway wheel 1 beneath the surface refined parts 6. To the melt obtained at the surface refinement, at least such a metal, metal alloy or metal mixture and/or at least such a ceramic is added, which permits that said parts 2a, 5 and 4a are less worn and/or get better sliding properties and/or give rise to less noise than what the base material of the body 7 of the railway wheel permits.

With the expression surface refinement or improvement it is here meant surface coating and/or surface impregnation and/or surface recovery.

This high-energy surface refinement can e.g. be accomplished by applying the beam 8 from a laser device (not shown) on said parts 2a, 5 and 4a while simultaneously adding said metallic materials 9 and/or ceramics 10 to the melt obtained by means of the beam 8. Preferably, said metal materials 9 as well as ceramics 10 are added to the melt.

Examples of metal materials 9 that can be added to the ment are yttrium, niobium, tantalum, nickel, chromium, cobolt, molybdenum, tin, lead, indium, zirconium, silicon, aluminium, titanium, tungsten or vanadium or at least one metal alloy or metal mixture containing at least one of these metals.

Ceramics 10 which can be added to the melt belong e.g. to the group including carbides, nitrides, oxids or borides. At least one such metal 9, metal alloy or metal mixture and/or at least one such ceramic 10 can be added to the melt and/or the surface refinement of the wheel tread 2 and the transition portion 5 between the wheel tread 2 and rail flange 4 and eventually the rail flange 4 can be conducted in such manner that the wheel tread 2 and the transition portion 5 between said wheel tread 2 and the rail flange 4 and eventually said rail flange 4 are worn at substantially the same rate.

The surface refinement can be carried out locally on the railway wheel 1 in such manner that substantial heating of the railway wheel 1 caused by the surface refinement only occurs locally within a small area in relation to the total range of the railway wheel 1 in and around the spot of surface refinement, whereby undesired extensive heating and thereby undesired changes of essential portions of the base material of the body 7 of the railway wheel 1 are avoided.

The railway wheel 1 can be surface refined while it is mounted on a wheel axis, whereby said railway wheel 1 during the surface refinement is cooled preferably with cooling air so that heat generated during said surface refinement is prevented from propagating into bearing parts in the railway wheel 1 and thereby preventing or obstructing unfavourable heating of lubricant present in said bearing parts.

Furthermore, the surface refinement is preferably extended in such a way that it covers at least parts of the transition portion 5 between the wheel tread 2 and the rail flange 4 and also extends in over at least parts 2a of the wheel tread 2 and/or parts 4a of the rail flange 4. Hereby, the surface refinement can be extended in such a way that it covers the entire transition portion 5 between the wheel tread 2 and the rail flange 4 and at least the parts 2a, 4a of said wheel tread 2 as well as said rail flange 4 located closest to said transition portion 5.

Figure 8:
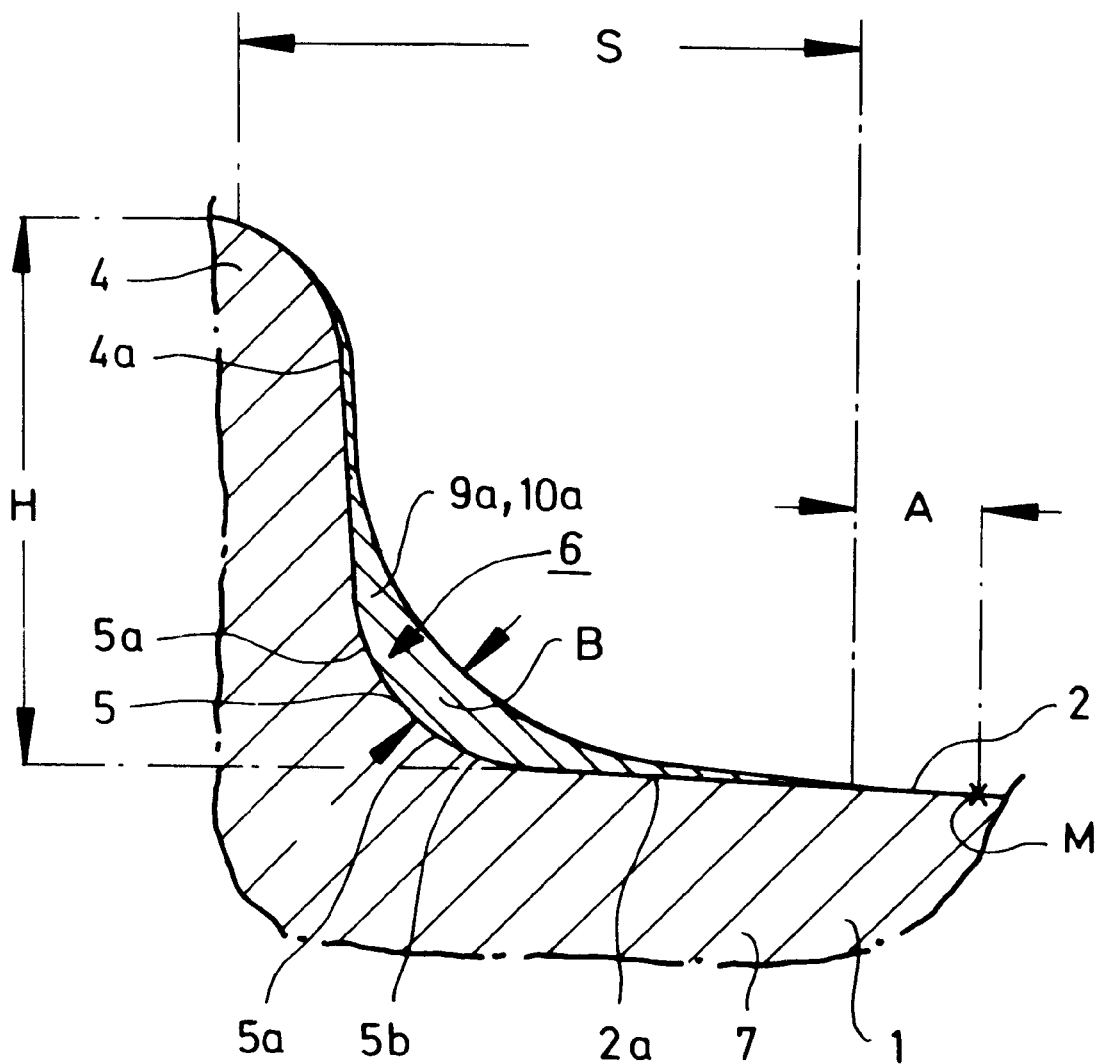
FIG. 8 illustrates a section of a part of the railway wheel with a finished surface treatment provided in accordance with the present method, and FIGS. 9,10,11,12,13 and 14 schematically illustrates parts of railway wheels on which surface treating strings are applied in accordance with the method of the invention in various patterns.

Furthermore, the surface refinement can be extended in such a way that it covers that part 2a of the wheel tread 2, which lies closest to the transition portion 5 and which is situated at a distance A (see FIG. 8) from a centre point M of the wheel tread 2, whereby the distance A is preferably 10–20 mm. The surface refinement can also be extended in such manner that it covers at least parts of the height H of the rail flange 4 between the wheel tread 2 and outer parts 4b of said rail flange 4. Preferably, the surface refinement can be extended such that it is thickest primarily in the central parts 5a of the transition portion 5 between the wheel tread 2 and the rail flange 4 and such that it from its thickest portion at primarily central parts 5a of the transition portion 5 has a successively decreasing thickness in direction towards the centre point M of the wheel tread 2 and the outer parts 4b of the rail flange 4.

However, it is often advantageous to surface refine the wheel tread 2 along its entire width, the entire transition portion 5 and the rail flange 4 all the way up to the outer parts 4b thereof and to about central portions of said outer parts 4b where said outer parts start to turn down in a direction towards the outer end surface of the railway wheel 1.

The surface refinement can e.g. be extended from the central parts 5a of the transition portion 5 (preferably from the centre of said central parts 5a) in a direction towards the outer parts 4b of the rail flange 4 and thereafter or before in a direction towards the wheel tread 2.

The surface refinement can be extended by locating surface refining strings 11 beside each other within an area C extending peripherally around the railway wheel 1 in the running direction thereof, so that said railway wheel 1 is in contact with the rail 3 through said surface refining strings 11.

Said surface refining strings 11 are shown schematically in the drawings as thin lines, but they are in fact substantially wider than these lines.

Figure 10:
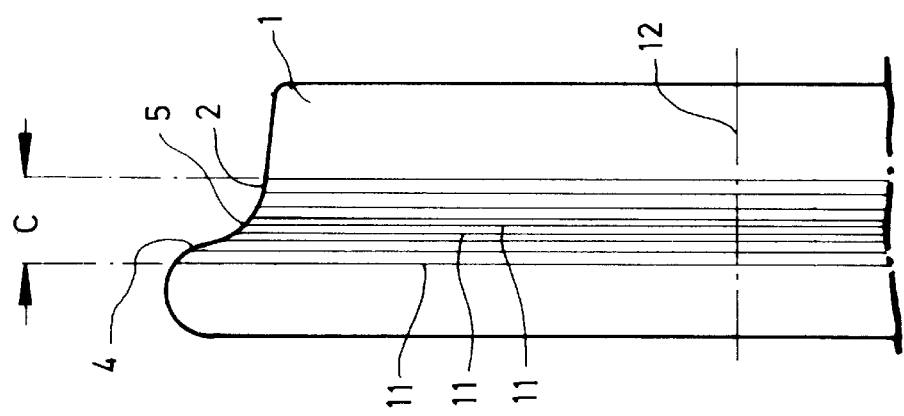
Figure 9:
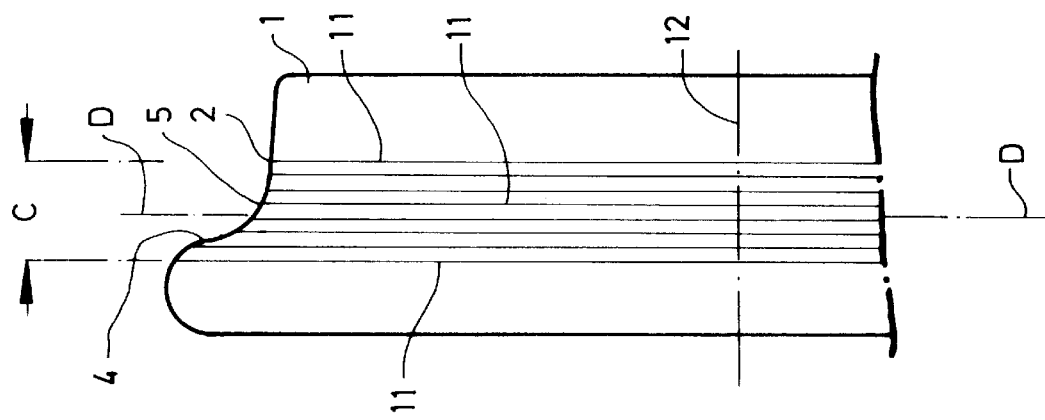

As is apparent from FIGS. 9 and 10, all these surface refining strings 11 are located in parallel with a plane or level D extending perpendicular or substantially perpendicular to the centre axis 12 of the railway wheel 1. Furthermore, each surface refining string 11 may extend around the railway wheel 1 as an endless surface refining ring which, seen from the side in radial direction towards the railway wheel 1, can be straight.

As is apparent from FIG. 9, the distances between all surface refining strings 11 may be the same. As is shown in FIG. 10 however, the distances between the surface refining strings 11 within the central parts 5a of the transition portion 5 (i.e. where the radius of the arcuate transition portion 5 is the smallest) can be small, while the distances between the surface refining strings 11 on the wheel tread 2 and/or rail flange 4 are larger and may increase successively in a direction from the central parts 5a of the transition portion 5.

Figure 11:
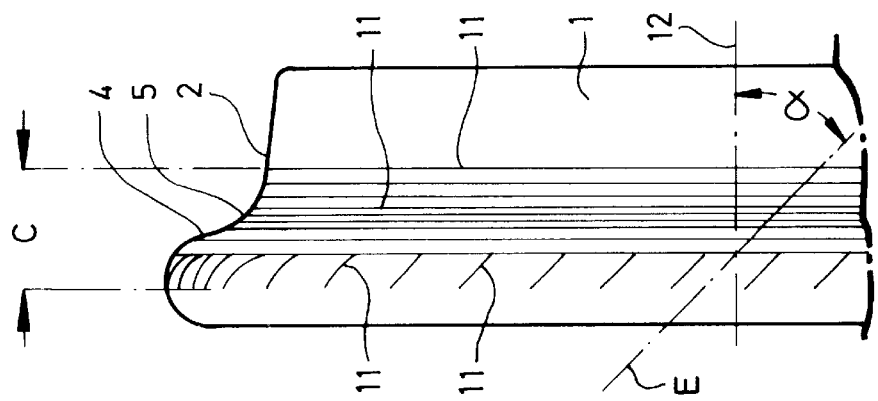

As is apparent from FIG. 11 some of the surface refining strings 11 can be located peripherally around the railway wheel 1 and in parallel with the plane D, i.e. perpendicular to the centre axis 12, while other surface refining strings 11 can be located in parallel with plane E, i.e. at an angle of 30–60° relative to said centre axis 12. From FIG. 12 it is also apparent that the surface refining strings 11 running in parallel with the plane D can be located on the transition portion 5 and on the parts 2a and 4a of the wheel tread 2 and rail flange 4 respectively, while the surface refining strings 11 running in parallel with plane or level E can be located on the rail flange 4 close to the part 4a.

Figure 14:
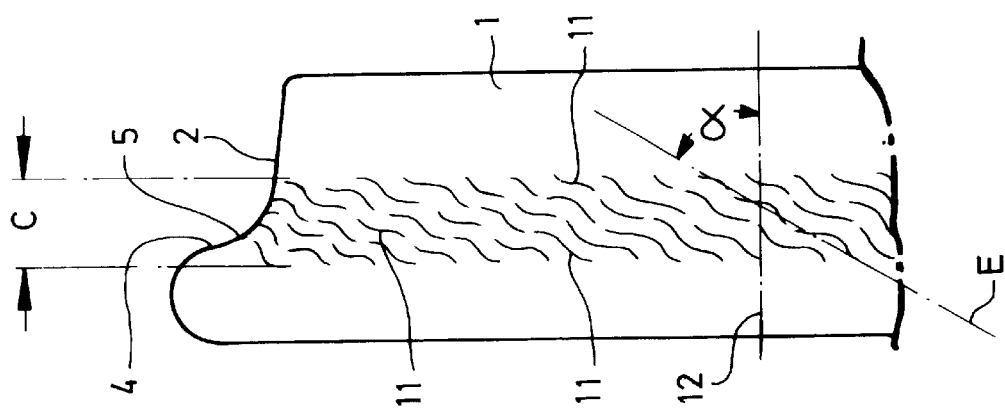
Figure 13:
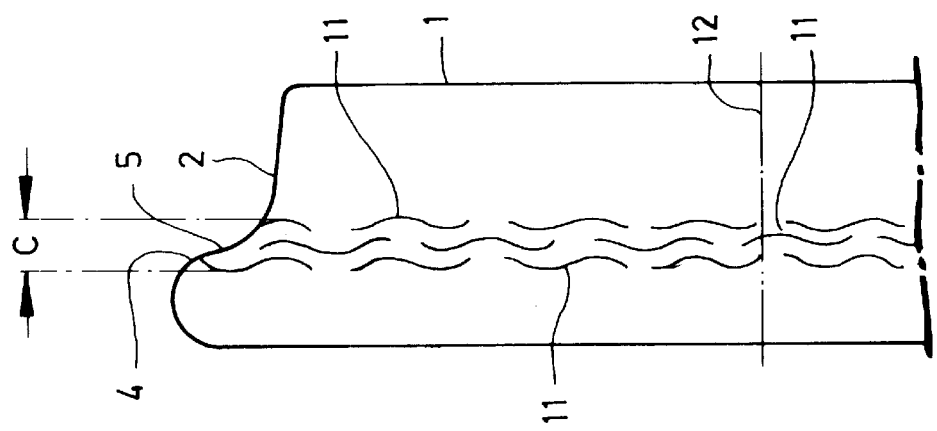
Figure 12:
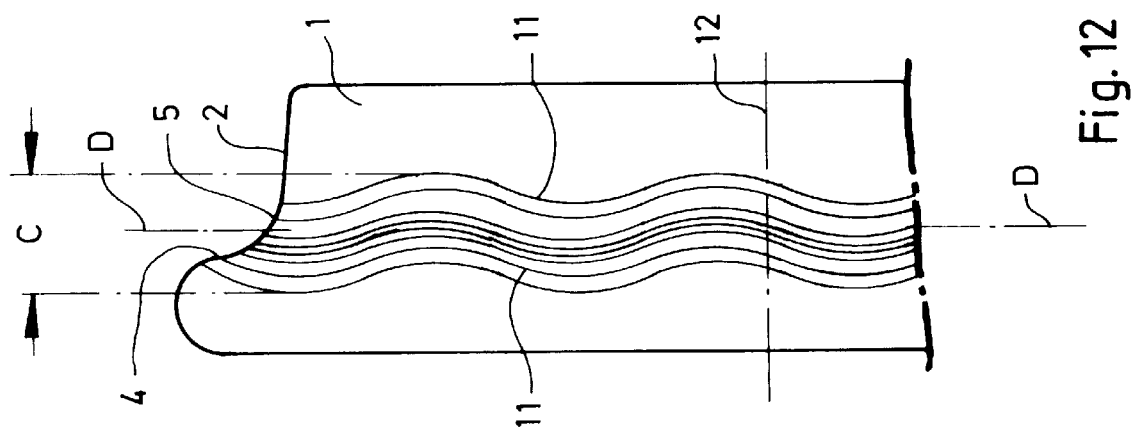

As is apparent from FIGS. 12–14, the surface refining strings 11 can—instead of being straight—be wave formed, e.g. have sine-wave shape. Each wave formed surface refining string 11 can be designed as a peripherally around the railway wheel 1 extending surface refining ring and each such surface refining string 11 can extend substantially in parallel with the plane D (see FIG. 12). The wave formed surface refining strings can be located at the same or at various relative distances in the same way as the surface refining strings 11 described above in connection with FIGS. 9 and 10. The wave shaped surface refining strings 11—and besides also the straight surface refining strings 11—can be positioned as "broken", peripherally around the railway wheel 1 extending surface refining ring, as is shown in FIG. 13. Alternatively, the wave formed surface refining strings 11 can be located such that they extend substantially in parallel with plane E (see FIG. 14).

Figure 6:
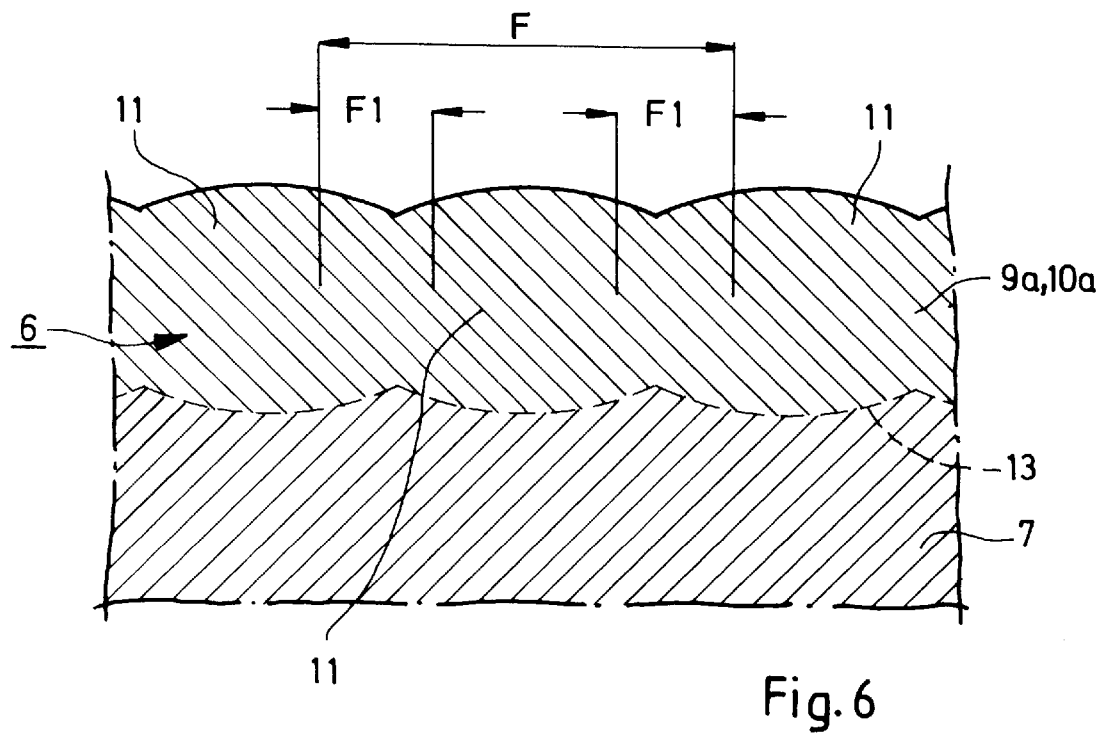
FIG. 6 is an enlarged section of a part of the railway wheel which in accordance with the method of the invention has been surface treated by surface application, whereby surface treating strings located beside each other have been integrated with each other.
Figure 7:
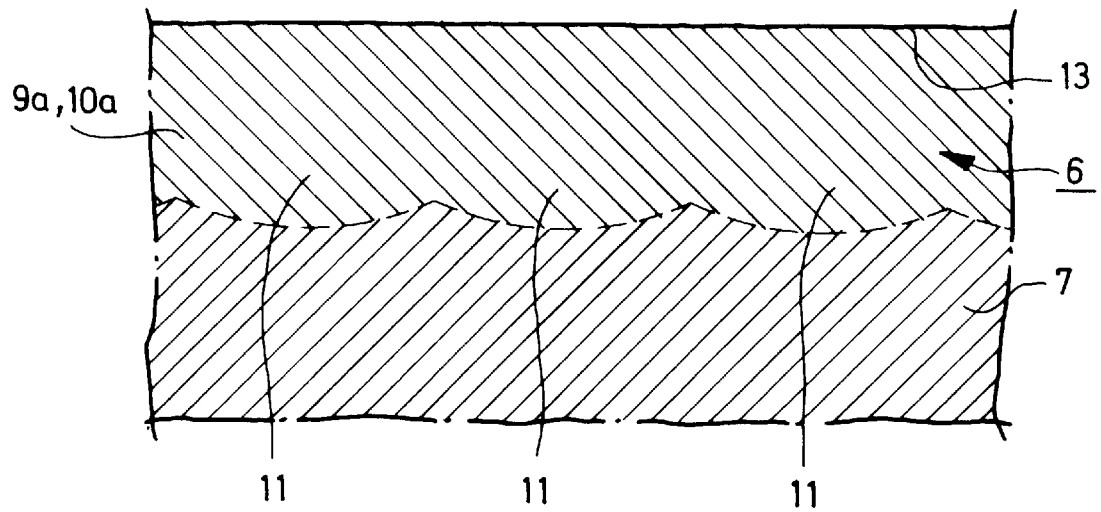
FIG. 7 illustrates a section of a part of the railway wheel which in accordance with the method of the invention has been surface treated by surface impregnation, whereby surface treating strings located beside each other are integrated with each other.

As is apparent from FIGS. 6 and 7, the surface refining strings 11 can be located so relative to each other that they extend partly integrated with each other.

Hereby, the surface refining strings can be integrated with each other so that a portion F1 of 2–50%, preferably 20–40%, of the width F of a surface refining string 11 is integrated with a portion F1 of 2–50%, preferably 20–40%, of another surface refining string 11, whereby a certain portion F1 of the width F of a surface refining string 11 preferably is integrated with as large or substantially as large a portion F1 of the width F of another surface refining string 11. This is illustrated in FIG. 6 and 7, wherein however, the surface of the surface refining strings 11 not yet has been smoothed or levelled for obtaining final surface smoothness.

Figure 3:
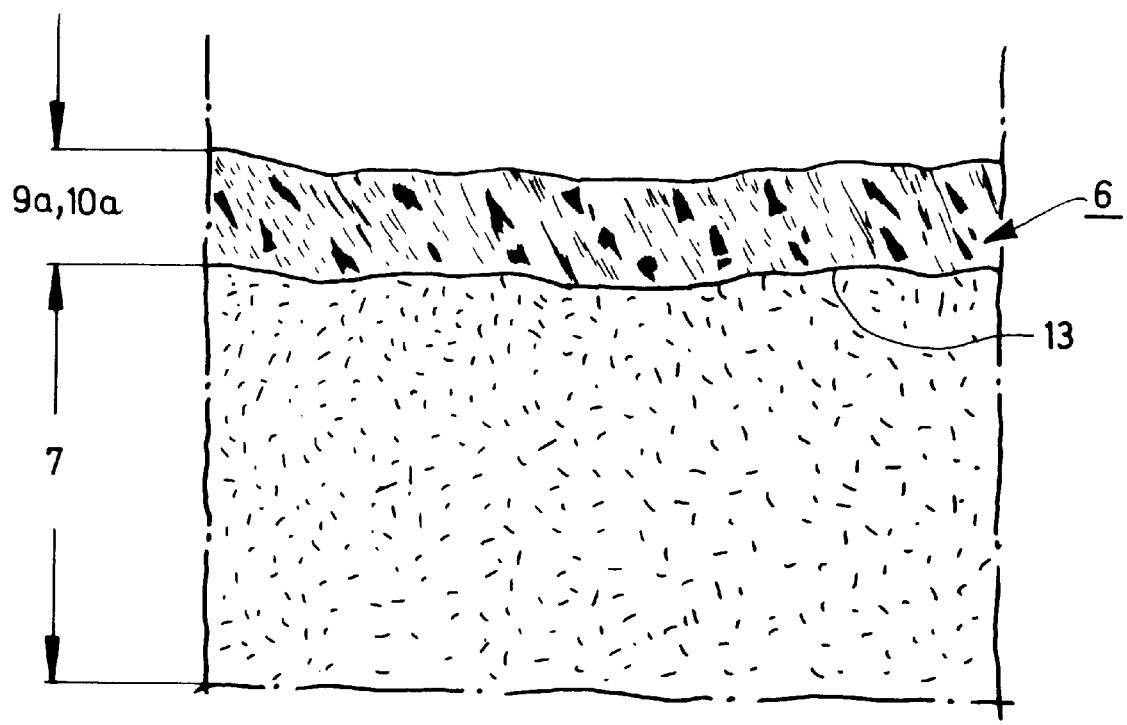
FIG. 3 schematically illustrates a substantial magnification of a section of an area of the railway wheel at which surface application or surface coating according to FIG. 2 has occured.
Figure 4:
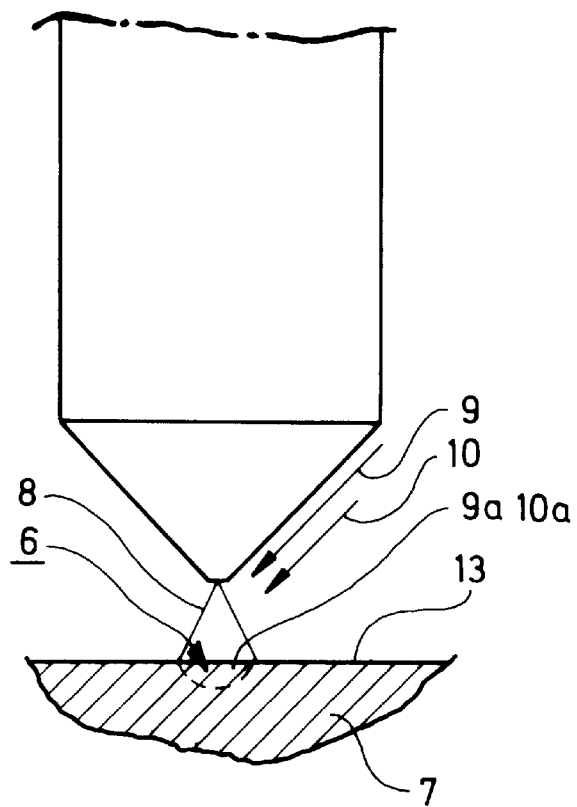
FIG. 4 schematically illustrates a surface treatment of the railway wheel according to the present method, whereby said surface treatment is a surface impregnation.

As is apparent from FIG. 3, at least a certain part of the railway wheel can be surface refined by applying on its original surface 13 a material 9 and/or 10 which has been added to the melt such that at least portions 9a and/or 10a of this material will be located above the original surface 13.

Figure 5:
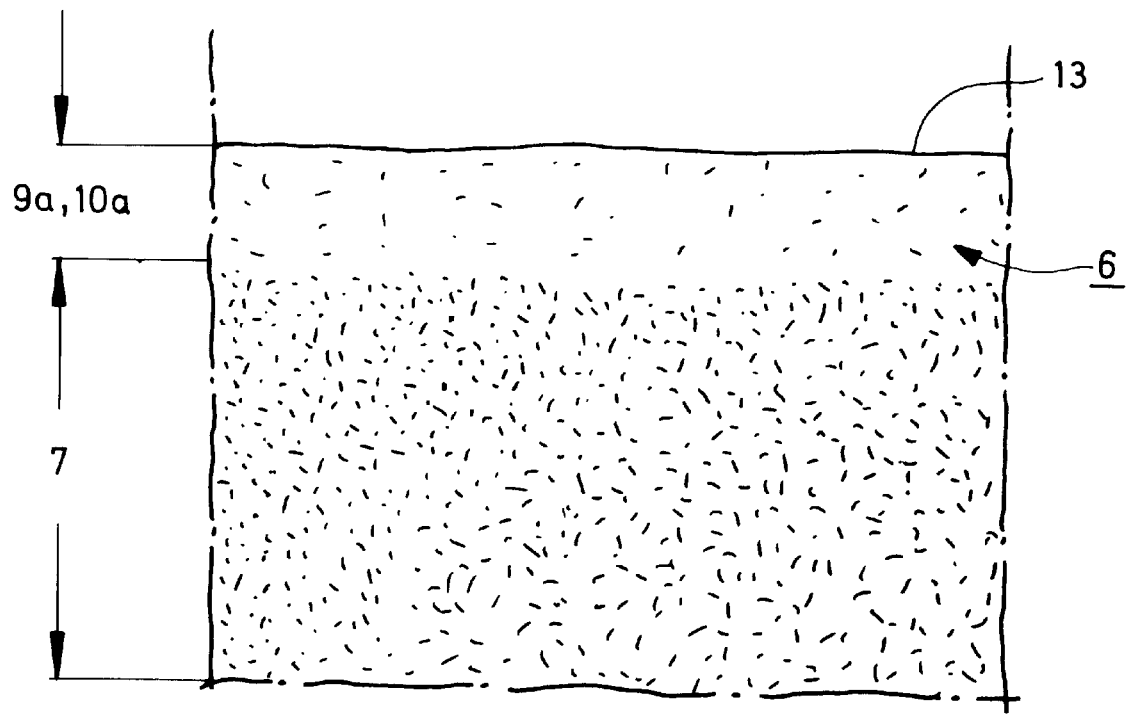
FIG. 5 illustrates a substantially magnified section of an area of the railway wheel at which surface impregnation according to FIG. 4 has occured.

As is apparent from FIG. 5, at least another certain part of the railway wheel 1 can be surface refined by impregnating its original surface 13 with the material 9 and/or 10 added to the melt, so that this material completely or that at least the main portion thereof will be located beneath the original surface 13.

The abovementioned application of material 9 and/or 10 on the original surface 13 may e.g. occur on the transition portion 5 and the wheel tread 2, while the abovementioned impregnation with material 9 and/or 10 of the original surface 13 may e.g. be carried out on the rail flange 4.

During the surface refinement, at least a metal 9, a metal alloy or metal mixture and/or at least a ceramic 10 can be added to the melt, so that the added material 9 and/or 10 remains substantially unchanged in the melt.

Finally, it should be mentioned that the railway wheel 1 can be preheated before the surface refinement, namely to a temperature above 200° C. and that the surface refined parts of the railway wheel 1 preferably are ground for obtaining the required surface smoothness and surface fineness.

The railway wheel 1 can be surface refined in its original design, preferably when it is newly manufactured. Alternatively, a ring (not shown) which is provided, e.g. shrunk-on a railway wheel 1 and adapted to cover worn parts of the railway wheel 1, is surface refined in accordance with said method.

The device and method according to the invention is not limited to what is defined above, but may vary within the scope of the following claims. An alternative example is that the maximum thickness B of the surface refined parts 6 in accordance with the requirements set can be 0.5 mm and any other thickness up to 5 mm, eventually increased with 10% at the most.

I claim:

1. A method for making a railway wheel for rolling on a rail, the railway wheel having a body which includes a tread, a flange, and an arcuate transition portion extending between the tread and the flange, the transition portion having a curved surface, said method comprising steps of:

selecting a thickness of surface refined parts to be applied to outer surfaces of the body of the railway wheel so that a Hertzian pressure acting on the railway wheel as a result of the railway wheel rolling on the rail is carried by the body lying beneath the surface refined parts;

preheating the railway wheel to at least 200° C;

applying energy generated by laser radiation to at least one local area selected from a group consisting of the tread, the flange, and the transition portion of the body of the railway wheel to create a melt on the outer surfaces of the body while simultaneously adding at least one material to the melt;

cooling the melt and the at least one material to form the surface refined parts having said thickness on the outer surfaces of the body of the railway wheel; and machining the surface refined parts to achieve a predetermined surface finish.

2. The method of claim 1 wherein the at least one material added to the melt is selected from a group consisting of a metal, a metal alloy, a metal mixture, a ceramic, and a metal and ceramic mixture.

3. The method of claim 1 wherein the surface refined parts are formed on the outer surfaces of the body of the railway wheel such that the tread, the flange, and the transition portion wear at approximately the same rate.

4. The method of claim 1 wherein the surface refined parts areas are formed on the body of the railway wheel when the railway wheel is mounted on a wheel axis, said step of cooling the melt and the at least one material is accomplished using cooling air to prevent heat generated during said step of applying energy from propagating into bearing parts of the railway wheel.

5. The method of claim 1 wherein the surface refined parts have a maximum thickness in a central portion of the transition portion of the body of the railway wheel.

6. The method of claim 5 wherein the surface refined parts have side thicknesses in the flange and in the tread which are less than the maximum thickness in the central portion of the transition portion.

7. The method of claim 1 wherein the surface refined parts comprise a plurality of surface strings extending peripherally around the railway wheel in a direction of travel of the railway wheel, the plurality of surface strings are for engaging the rail.

8. The method of claim 7 wherein at least one of the plurality of surface strings extends at an angle of between 30° and 60° relative to an axis through a center of the railway wheel.

9. The method of claim 7 wherein at least one of the plurality of surface strings extends peripherally around the railway wheel in a wave-shaped pattern.

* * * * *